United States Patent
Stewart et al.

(10) Patent No.: US 7,951,341 B2
(45) Date of Patent: May 31, 2011

(54) REACTOR DESIGN FOR SMALLER BATCH TRANSFERS OF CATALYST

(75) Inventors: Douglas G. Stewart, Wheeling, IL (US); Mark G. Riley, Hinsdale, IL (US); Peter M. Bernard, Chicago, IL (US)

(73) Assignee: UOP LLC, Des Plaines, IL (US)

( * ) Notice: Subject to any disclaimer, the term of this patent is extended or adjusted under 35 U.S.C. 154(b) by 469 days.

(21) Appl. No.: 12/145,576

(22) Filed: Jun. 25, 2008

(65) Prior Publication Data
US 2009/0324465 A1     Dec. 31, 2009

(51) Int. Cl.
*B01J 8/08* (2006.01)
*F27B 15/08* (2006.01)

(52) U.S. Cl. ........ 422/213; 422/139; 422/145; 422/146; 422/216

(58) Field of Classification Search .................. 422/139, 422/145, 146, 190, 216, 168, 173, 213
See application file for complete search history.

(56) References Cited

U.S. PATENT DOCUMENTS

| | | | | |
|---|---|---|---|---|
| 3,799,866 A | * | 3/1974 | Lengemann | 208/139 |
| 3,838,039 A | * | 9/1974 | Vesely et al. | 208/108 |
| 4,040,794 A | * | 8/1977 | Stone | 422/190 |
| 4,102,776 A | * | 7/1978 | Stone | 208/64 |
| 4,443,419 A | * | 4/1984 | Carson | 423/244.06 |
| 4,624,748 A | * | 11/1986 | Haunschild | 203/29 |
| 5,820,655 A | | 10/1998 | Gottzmann et al. | |
| 6,177,381 B1 | | 1/2001 | Jensen et al. | 502/325 |
| 6,756,515 B2 | | 6/2004 | Rende et al. | 585/444 |
| 7,070,742 B2 | | 7/2006 | Lenglet et al. | |
| 2007/0003460 A1 | | 1/2007 | Matsumoto et al. | |

FOREIGN PATENT DOCUMENTS
WO    WO2006/075130 A1    7/2006

OTHER PUBLICATIONS
U.S. Appl. No. 12/145,588, filed Dec. 31, 2009, Stewart et al.

\* cited by examiner

*Primary Examiner* — Walter D Griffin
*Assistant Examiner* — Huy-Tram Nguyen
(74) *Attorney, Agent, or Firm* — Arthur E. Gooding

(57) ABSTRACT

A moving bed of catalyst loses activity as it moves through the reactor. Creating multiple passes for the process fluid moving across a catalyst bed, increases the utilization of the catalyst and creates a pseudo-counter current flow of catalyst and process fluid. The flow improves the temperature profile of the bed and allows higher temperature fluid contacting the less active catalyst.

18 Claims, 5 Drawing Sheets

REACTOR DESIGN FOR SMALLER BATCH TRANSFERS OF CATALYST

FIELD OF THE INVENTION

This invention relates to a radial flow reactor for use in a hydrocarbon conversion process. The process involves a catalyst moving down through the reactor, where the catalyst becomes deactivated over time, and the fluid reactants move across the reactor bed.

BACKGROUND OF THE INVENTION

A process for the conversion of paraffins to olefins involves passing a normal paraffin stream over a highly selective catalyst, where the normal paraffin is dehydrogenated to the corresponding mono-olefin. The dehydrogenation reaction is achieved under mild operating conditions, thereby minimizing the loss of feedstock.

The typical process involves the use of a radial flow reactor where a paraffin feedstock is contacted with a dehydrogenation catalyst under reaction conditions. The typical process involves dehydrogenating linear paraffins in the C7 to C11 range to produce olefins used as plasticizers, for dehydrogenating paraffins in the C10 to C14 range to produce linear olefins for the production of linear alkyl benzenes (LABs), and for dehydrogenating paraffins in the C12 to C17 range to produce detergent alcohols or olefin sulfonates.

The process is affected by reactor design, and processing costs can increase substantially if the catalyst is underutilized, the reactor is required to be shut down to reload catalyst, or operating conditions need to be significantly changed as the catalyst deactivates.

SUMMARY OF THE INVENTION

In a radial flow reactor, the catalyst moves downward through an annular region, while the fluid reactants move across the catalyst bed. As the catalyst moves downward and processes more of the feedstream, it becomes less active. The reduction in activity requires the increase in temperature of the operating conditions to maintain the desired level of conversion. The present invention redesigns the reactor to take advantage of the lower activity catalyst as the catalyst flows through the reactor. The invention comprises a radial flow reactor having a substantially cylindrical housing. Disposed within the housing is a centerpipe with a process fluid inlet and a process fluid outlet, and where the centerpipe is perforated to allow for the passage of fluid through the centerpipe wall, but prevents the passage of solid catalyst. The reactor further includes an annular perforated screen disposed between the centerpipe and the housing, thereby forming a region for holding the flowing catalyst through the reactor between the centerpipe and the annular perforated screen, and an annular space between the annular screen and the housing wall. The centerpipe includes a restriction within the pipe to prevent the flow of process fluid directly from the inlet to the outlet. The process fluid is thereby directed across the catalyst bed from the centerpipe to the annular space, and redirected to flow back across the catalyst bed.

In another embodiment, the invention comprises a plurality of restrictions within the centerpipe, and a plurality of seals between the annular screen and the reactor housing to increase the number of times the process fluid traverses the catalyst bed.

Other objects, advantages and applications of the present invention will become apparent to those skilled in the art from the following detailed description and drawings.

DETAILED DESCRIPTION OF THE INVENTION

The use of radial flow reactors is common in the hydrocarbon processing industry. One example is the conversion of paraffins to olefins, where a paraffin rich gas is passed over a catalyst to dehydrogenate the paraffins to generate a product stream comprising olefins. The dehydrogenation reaction is achieved under mild operating conditions to minimize loss of the feedstock to byproducts. The paraffins to olefins conversion is important for the production of linear alkylbenzenes, where linear paraffins in the C7 to C26 range to produce linear alpha olefins.

In some processes, as the catalyst deactivates, the operating temperature is raised to off-set the reduction in catalyst activity, until the selectivity is too poor to continue the process. This is often done 30-40 times during a cycle, and then the catalyst is replaced in the reactor. Before the process of replacing catalyst begins, the reactor operating temperature is lowered to accept the cooler catalyst, and the feed flow is reduced to insure that catalyst is not pinned to the catalyst screen. That is, at sufficiently high flow rates of the reactor fluid, the catalyst can be held against the catalyst screen and not flow through the reactor, and therefore to insure its movement, the fluid flow is reduced. This process requires a significant amount of time and results in lost productivity.

Figure 1:
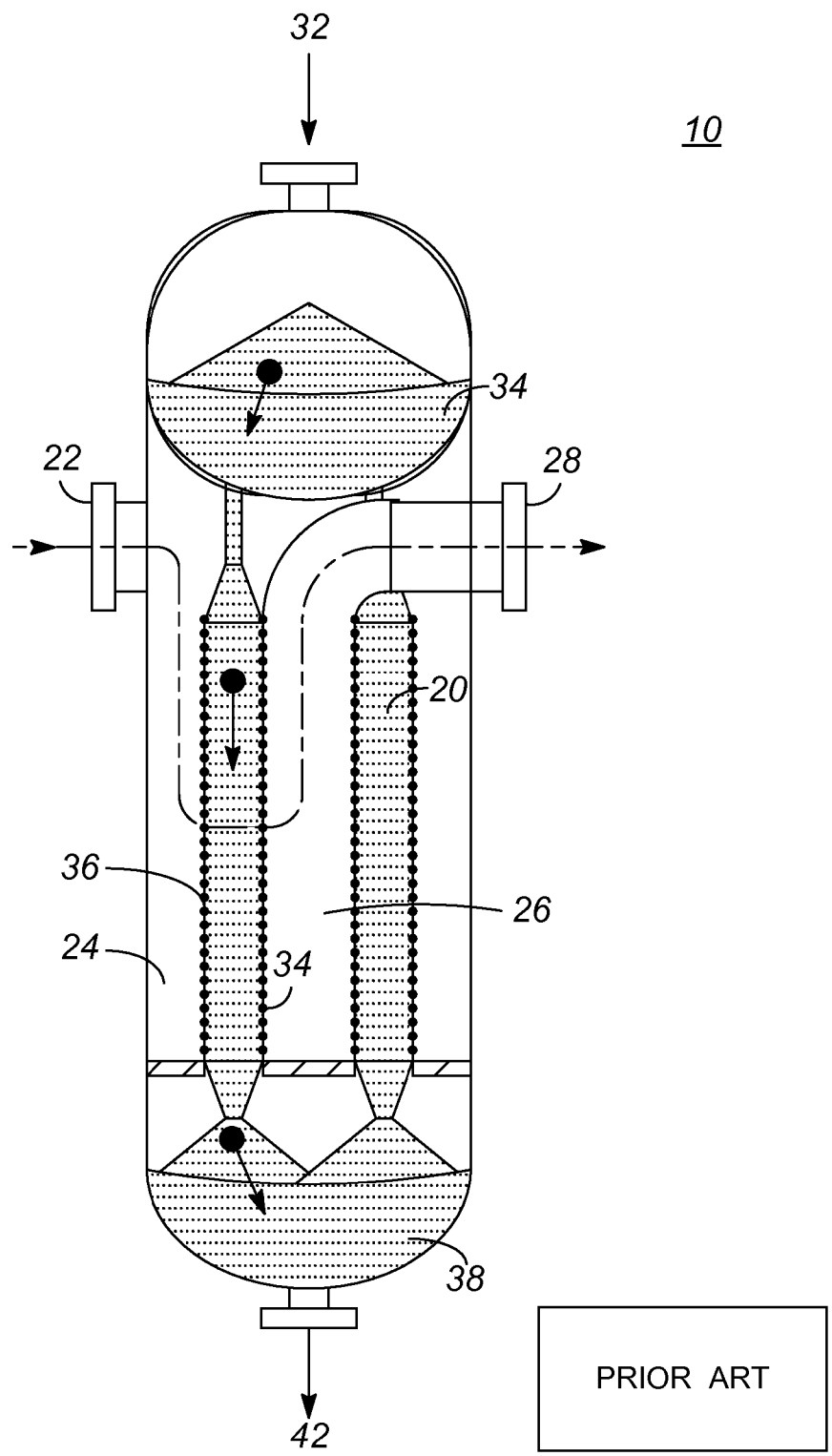
FIG. 1 is a standard radial flow reactor design.

A radial flow reactor 10, as shown in FIG. 1 and as used in a paraffins to olefins conversion reactor, comprises an annular reactor bed 20 for holding catalyst, an inlet port 22 for admitting a fluid, where the fluid flows around an annular space 24, across the reactor bed 20, and into a centerpipe 26. The product then flows out the centerpipe 26 to a product outlet port 28. Fresh catalyst enters through a catalyst inlet port 32, into a reduction zone 34, where the catalyst is prepared with hot hydrogen before entry to the reactor bed 20. Catalyst enters the reactor bed 20, where it is confined between two annular screens 34, 36, flows through the reactor bed 20 and is collected in a collection zone 38. The spent catalyst is withdrawn from the collection zone 38 through a catalyst outlet port 42 and directed to a regeneration unit.

Figure 2:
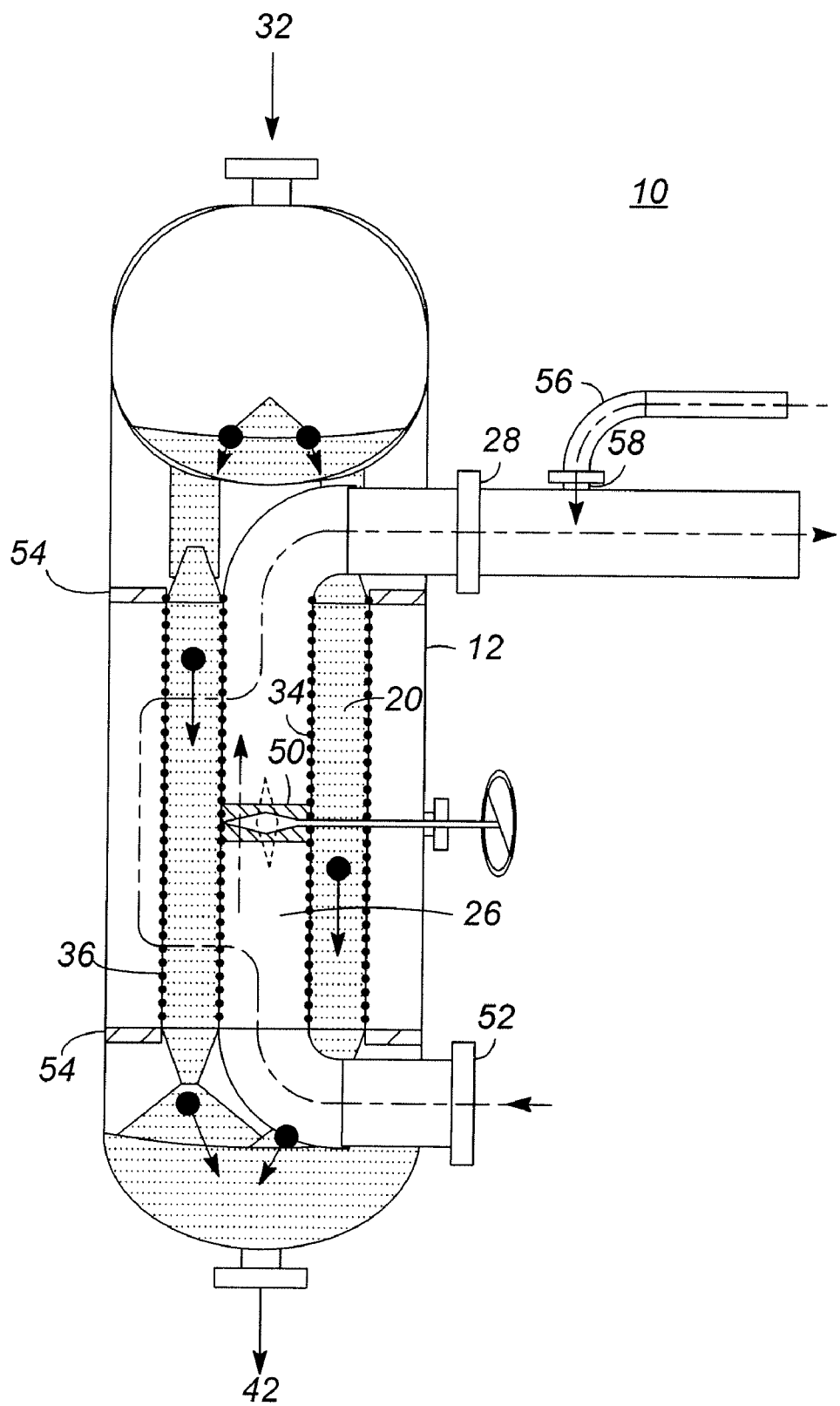
FIG. 2 is a diagram of one embodiment of the invention, with a single valve.

The present invention allows for the catalyst to be added in smaller increments, and to increase the catalyst utilization. The invention forces multiple passes of the fluid through the annular reactor bed 20. In a first embodiment, as shown in FIG. 2, the radial flow reactor comprises a substantially cylindrical housing 12 having a central axis, and having a catalyst inlet port 32 at the top of the reactor 10 and a catalyst outlet port 42 at the bottom of the reactor 10. The reactor 10 includes a centerpipe 26, which can comprise a perforated tube, a tubular structure with catalyst screens 34, or any other structure that permits the flow of fluid across the centerpipe wall 34 which is also a catalyst screen, while preventing the flow of catalyst into the centerpipe 26. The reactor 10 further includes an annular perforated screen 36 disposed between the centerpipe wall 34 and the housing 12, and a restriction 50 disposed within the centerpipe 26. The fluid inlet 52 is now in fluid communication with one end of the centerpipe 26. The restriction 50 forces the fluid across the reactor bed 20, and the fluid returns through the reactor bed 20 at a position further up the reactor bed 20 and returns to the centerpipe 26. The reactor 10 further includes seals 54 between the annular screen 36 and the reactor housing 12.

In one embodiment, the restriction 50 is a valve that can be opened to allow free passage of the fluid, or closed to force the fluid through the reactor bed 20. With a valve, the restriction 50 can allow some by-pass flow that does not go through the catalyst bed 20. This is useful for reducing the flow rate when there is catalyst pinning, or there is a need to control or reduce the amount of reaction taking place. The reactor 10 further can optionally include a quench fluid line 56. The quench fluid line 56 is in fluid communication with the centerpipe outlet 28, through a quench fluid inlet port 58. The quench fluid can be used during any by-pass operation to facilitate maintaining a stable operation of the reactor 10. The quench fluid, usually gaseous hydrogen, would cool the outlet stream when there is insufficient endothermic reaction taking place in the reactor bed 20, or when there is a significant bypass of the fluid from going across the reactor bed 20. An alternate quench fluid is a liquid paraffin, entering through the quench inlet port 58 at a temperature of less than 100° C.

Figure 3:
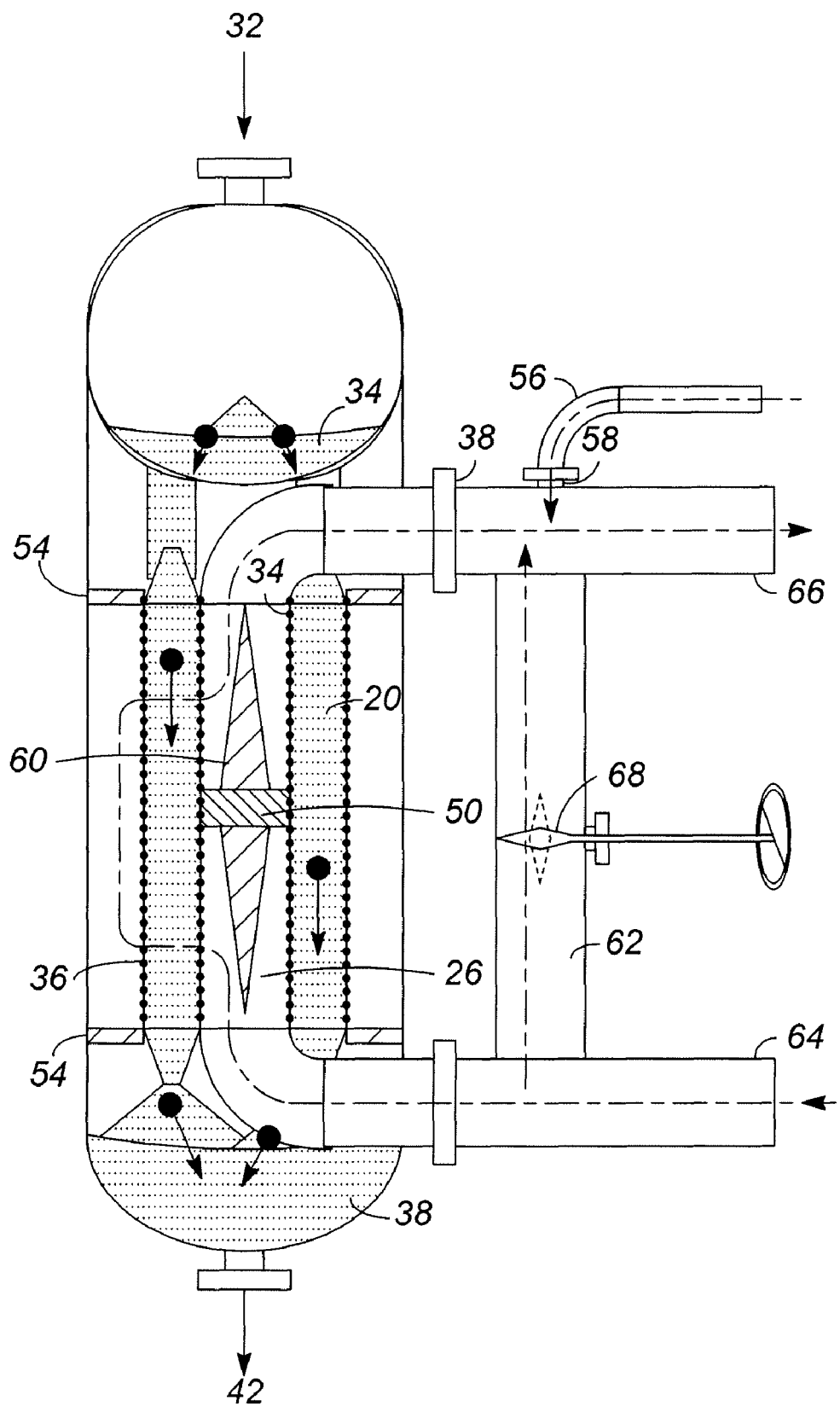
FIG. 3 is a diagram of a second embodiment with a cone fill for reducing the void space in the centerpipe, and a bypass.

In a second embodiment, as shown in FIG. 3, the restriction 50 is a seal. A seal provides a simpler structure for the reactor 10, and removes a need for providing ports through the reactor for the mechanical components required to open and close the valve. In this embodiment, an optional volume fill section 60 in the centerpipe 26. The volume fill section 60 reduces the residence time of the fluid in the centerpipe 26, which can reduce the chance of side reactions, such as thermal cracking taking place. Preferably, the volume fill section 60 is a conic shaped section, and provides additional control over directing flow through the reactor bed 20 and directing the product stream out of the centerpipe 26. The second embodiment further includes an optional by-pass conduit 62. The by-pass conduit 62 allows for control of flow through the reactor 10, and can reduce the flow when there is pinning of catalyst, or for other reasons where it is necessary to reduce the flow to the reactor 10. The by-pass conduit 62 provides fluid communication between the inlet pipe 64 to the centerpipe 26 and the outlet pipe 66 from the centerpipe 26. The by-pass conduit 62 includes a valve 68 for opening and closing the by-pass conduit 62.

Figure 4:
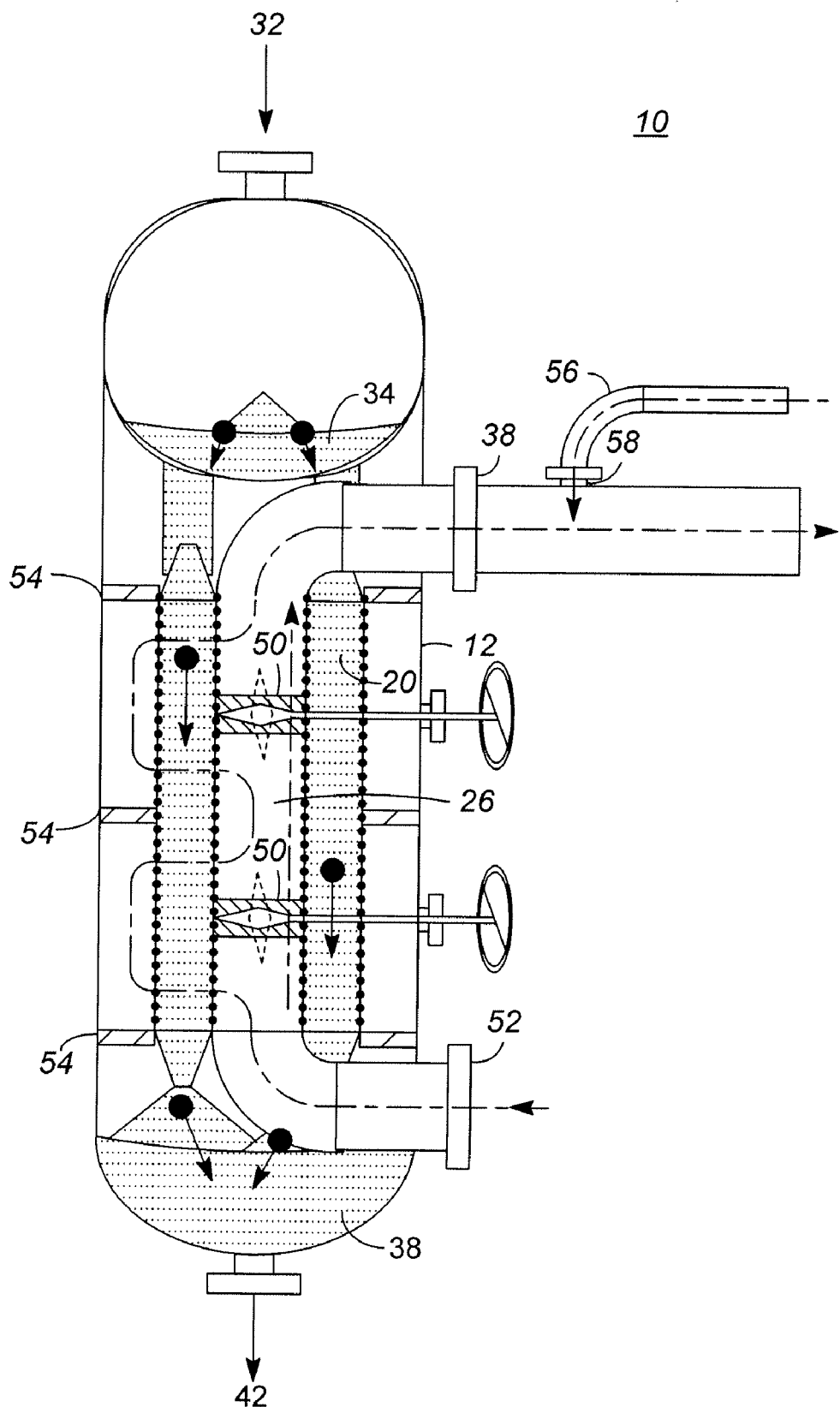
FIG. 4 is a third embodiment of the invention with multiple valves in the centerpipe and multiple passes through the catalyst bed.

In a third embodiment, as shown in FIG. 4, the reactor 10 comprises a plurality of restrictions 50 within the centerpipe 26. In FIG. 4 two restrictions 50 are shown for illustration, but more restrictions 50 can be added. The number of restrictions 50 is subject to the size of the reactor 10, the length of the centerpipe 26, and other design considerations, such as limits on operating conditions and mechanical limitations. The reactor 10 includes seals 54 at the top and bottom of the reactor bed 20 between the annular perforated screen 36 and the reactor housing 12. The reactor 10 includes additional seals 54 positioned between successive restrictions 50. This provides for a plurality of passes in the reactor bed 20 by the process fluid. When the restrictions 50 are valves, the valves provide control to by-pass the reactor bed 20 when there is catalyst pinning or the need to reduce the rate of reaction.

Figure 5:
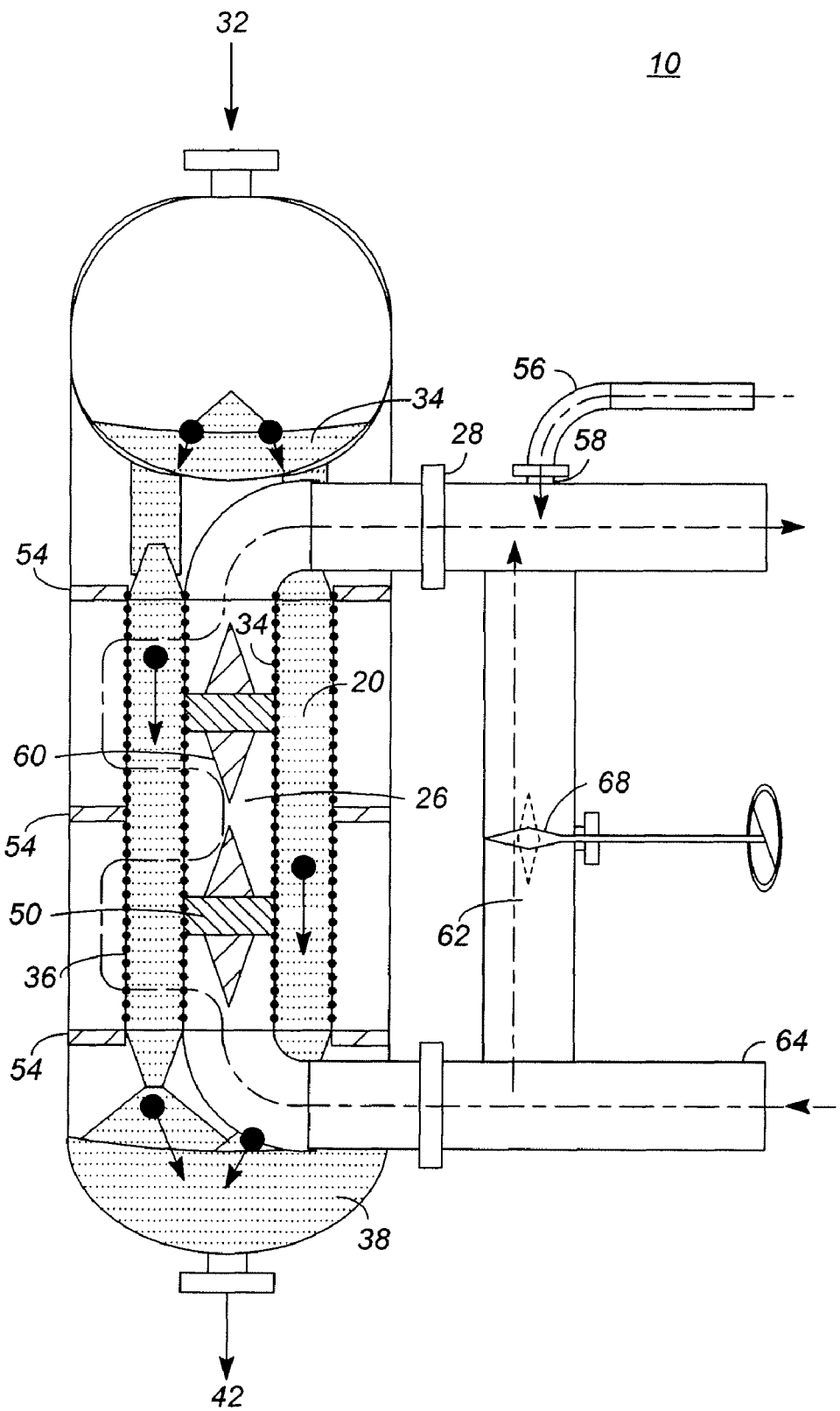
FIG. 5 is a fourth embodiment with a flow bypass.

A fourth embodiment, as shown in FIG. 5, comprises a reactor 10 with a plurality of restrictions 50 within the centerpipe 26, wherein the restrictions 50 are seals that do not open or close, as described above in the second embodiment. The centerpipe 26, optionally includes volume fill sections 60 for reducing residence time of the fluid within the centerpipe. This embodiment further includes an optional by-pass conduit 62. The by-pass conduit 62 allows for control of flow through the reactor 10. The by-pass conduit 62 provides fluid communication between the inlet pipe 64 to the centerpipe 26 and the outlet pipe 66 from the centerpipe 26. The by-pass conduit 62 includes only one valve 68 for opening and closing the by-pass conduit 62, instead of multiple valves as in the third embodiment.

By providing two or more passes of the fluid across the reactor bed 20, and with the flow of fluid crossing the catalyst having the longest reactor residence time first, and the newest catalyst last, lower activity catalyst contacts higher temperature gas and improves the process. The catalyst is added in a semi-continuous process in small batches that has cooler catalyst added to the top of the reactor bed 20 where the reactor is coolest, and the catalyst withdrawn from the catalyst bed is the hottest and has lost the most activity.

The reactor 10 with multiple passes provides a pseudo counter-current radial flow reactor. The process fluid enters the reactor centerpipe 26, and successively contacts higher activity catalyst as the process fluid passes back and forth across the reactor bed 20, before exiting the reactor 10 as a product stream. The pseudo counter-current radial flow reactor also provides a favorable temperature profile, by allowing hotter gas to enter the reactor and contact lower activity catalyst. As the process fluid proceeds through the reactor and reacts, the temperature drops and the process fluid contacts successively the higher activity catalyst, and reduces the incremental batch feed of catalyst.

While the invention has been described with what are presently considered the preferred embodiments, it is to be understood that the invention is not limited to the disclosed embodiments, but it is intended to cover various modifications and equivalent arrangements included within the scope of the appended claims.

The invention claimed is:

1. A radial flow reactor comprising:
a substantially cylindrical housing having a central axis, and having a catalyst inlet port at the top of the reactor and a catalyst outlet port at the bottom of the reactor;
a centerpipe having an inlet and an outlet, and with the centerpipe axis substantially aligned with the housing central axis, and the centerpipe has a perforated wall for allowing the passage of fluid through the centerpipe wall;
an annular perforated screen disposed between the centerpipe and the housing; and
a restriction disposed within the centerpipe for blocking flow through the centerpipe, wherein the restriction is a valve allowing for opening and closing flow through the centerpipe.

2. The radial flow reactor of claim 1 further comprising seals between the annular perforated screen and the housing.

3. The radial flow reactor of claim 1 further comprises a bypass conduit providing fluid communication between the reactor feed inlet and the reactor product outlet.

4. The radial flow reactor of claim 1 further comprising a quench fluid inlet port.

5. The radial flow reactor of claim 4 wherein the quench fluid is hydrogen.

6. The radial flow reactor of claim 5 wherein quench fluid is a liquid paraffin at a temperature less than 100° C.

7. The radial flow reactor of claim 1 further comprising multiple restrictions in the centerpipe.

8. The radial flow reactor of claim 7 wherein the restrictions are valves.

9. The radial flow reactor of claim 7 further comprising multiple seals between the annular perforated screen and the housing.

10. The radial flow reactor of claim 1 further comprising a volume fill section for filling volume in the centerpipe.

11. The radial flow reactor of claim 10 wherein the volume fill section is a conic section.

12. A radial flow reactor comprising:
- a substantially cylindrical housing having a central axis, and having a catalyst inlet port at the top of the reactor and a catalyst outlet port at the bottom of the reactor;
- a centerpipe having an inlet and an outlet, and with the centerpipe axis substantially aligned with the housing central axis, and the centerpipe has a perforated wall for allowing the passage of fluid through the centerpipe wall;
- an annular perforated screen disposed between the centerpipe and the housing, forming an annular catalyst bed zone;
- a catalyst reduction zone disposed between the catalyst inlet port and the annular catalyst bed zone;
- a catalyst collection zone disposed between the annular catalyst bed zone and the catalyst outlet port; and
- a valve disposed within the centerpipe for blocking flow through the centerpipe.

13. The radial flow reactor of claim 12 further comprising seals between the annular perforated screen and the housing.

14. The radial flow reactor of claim 12 further comprises a bypass conduit providing fluid communication between the reactor feed inlet and the reactor product outlet.

15. The radial flow reactor of claim 12 further comprising a quench fluid inlet port.

16. The radial flow reactor of claim 15 wherein the quench fluid is hydrogen.

17. The radial flow reactor of claim 15 wherein the quench fluid is a liquid paraffin at a temperature less than 100° C.

18. The radial flow reactor of claim 12 further comprising multiple valves in the centerpipe.

* * * * *